United States Patent [19] [11] 4,397,663
Michlin et al. [45] Aug. 9, 1983

[54] SELF-CONTAINED DISPOSABLE DEVELOPER/ABSORBER PACKAGE

[75] Inventors: Norman Michlin, Southfield; Edward J. Thies, Warren, both of Mich.

[73] Assignee: Universal Developer Corporation, Detroit, Mich.

[21] Appl. No.: 314,283

[22] Filed: Oct. 23, 1981

Related U.S. Application Data

[62] Division of Ser. No. 172,105, Jul. 25, 1980, Pat. No. 4,334,756.

[51] Int. Cl.³ .............................................. B01D 53/04
[52] U.S. Cl. ........................................... 55/387; 55/70
[58] Field of Search .................. 55/70, 316, 387, 516, 55/518, 519; 210/282, 438, 443, 456; 354/300

[56] References Cited

U.S. PATENT DOCUMENTS

| | | | |
|---|---|---|---|
| 1,787,875 | 1/1931 | Perrott et al. | 55/70 |
| 1,926,505 | 9/1933 | Turner | 210/282 X |
| 2,014,445 | 9/1935 | Miller | 210/282 X |
| 2,389,225 | 11/1945 | Wieczorek, Jr. et al. | 55/387 |
| 3,744,976 | 7/1973 | Tongue | 55/71 X |
| 3,915,708 | 10/1975 | Zausmer et al. | 354/300 X |
| 4,059,409 | 11/1977 | Barto et al. | 354/300 X |
| 4,162,289 | 7/1979 | Gomez et al. | 55/316 X |
| 4,303,329 | 12/1981 | Michlin | 55/70 X |
| 4,333,752 | 6/1982 | Thies et al. | 55/387 |

Primary Examiner—Robert H. Spitzer
Attorney, Agent, or Firm—Krass, Young & Schivley

[57] ABSTRACT

A self-contained disposable package including a container of diazo copy developer liquid and an ammonia vapor absorber canister is disclosed for use with diazo type copy machines. The container of developer liquid and an absorber canister are adapted to be readily hooked into the supply and exhaust lines of the copy machine developer chamber and to the exhaust line of a machine degassing chamber. The absorber canister includes a quantity of ammonia vapor absorber material such as a mixture of excelsior and activated carbon, both treated with phosphoric acid, into which is extended a flow tube adapted to be connected to the degassing exhaust chamber with the exhaust flow directed to emanate from the lower region of the canister an flow upwardly through the absorber material and then out through openings in a top cap. The construction of the canister minimizes flow channelization through the absorber material.

5 Claims, 7 Drawing Figures

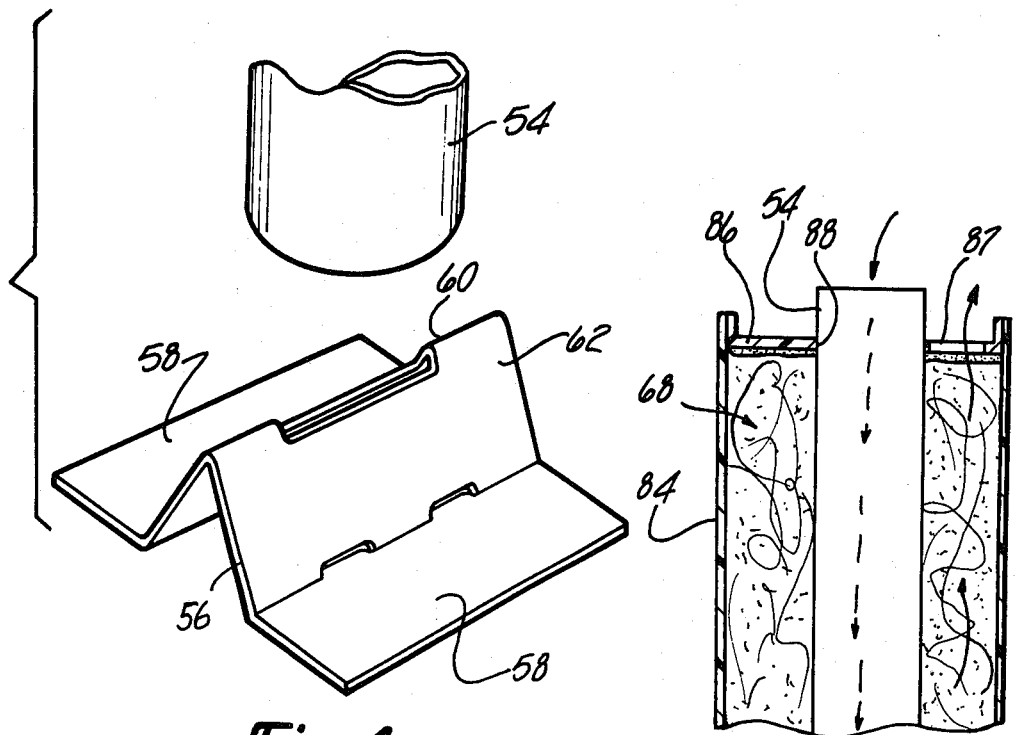
Fig-4
Fig-5
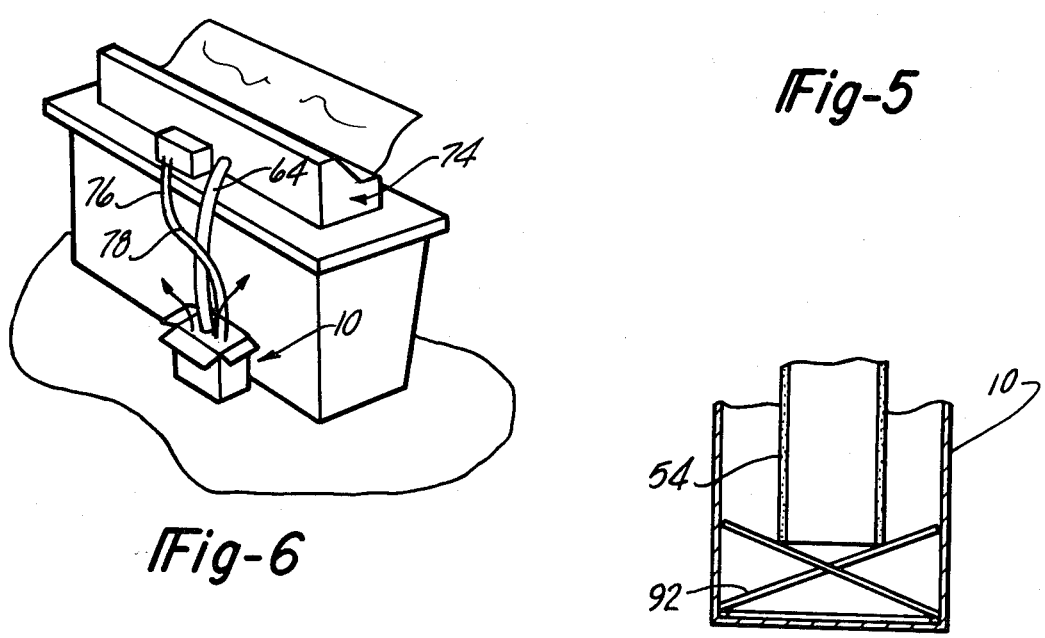
Fig-6
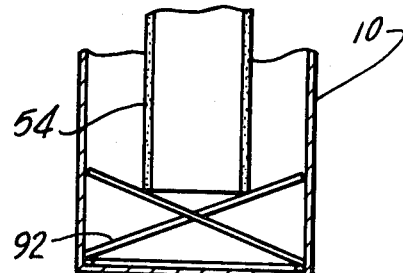
Fig-7

SELF-CONTAINED DISPOSABLE DEVELOPER/ABSORBER PACKAGE

This application is a division, of application Ser. No. 172,105, filed July 25, 1980, now U.S. Pat. No. 4,334,756.

BACKGROUND DISCUSSION

Diazo type copy machines require a source of developer vapor in order to develop exposed diazo paper. A common arrangement for such machines is the provision of a container of ammonia hydroxide liquid through which air is circulated from a developer chamber included in the machine and supplied to a pair of tubes, one of which is disposed within the liquid level and the other above the liquid level such that air from the developer chamber passes through the longer length tube, bubbles through the liquid and exits through the shorter length tube into the developer chamber via connecting flexible lines. This process provides a source of water and ammonia vapor for the developer chamber, the presence of which achieves the development of the exposed prints.

In U.S. Pat. No. 3,915,708, there is described a particular ammonia-water solution containing carbon dioxide which reduces the escape of ammonia vapor in the process.

However, it is common to provide the developer machine with a degassing chamber in which a suction is developed to draw off the ammonia vapors emanating from the developer paper after it passes through the developer chamber to eliminate or reduce the ammonia vapor smell from the copies. The air and vapors in the degassing chamber is either exhausted to the outside of the room or building or more commonly is passed through an absorber canister so as to allow direct exhaust into the room and obviating the need for extensive exhaust hookups for operation of the machine.

Such containers of developer liquid periodically become exhausted of the ammonia content requiring replacement. Similarly, the absorber canisters eventually become saturated, losing their absorptive powers and require replacement.

The absorber canister typically comprises a tube or other container within which is disposed an absorber material such as activated charcoal.

In U.S. Ser. No. 38,031, filed May 10, 1979, now U.S. Pat. No. 4,303,329, there is disclosed a diazo copy machine having a particular ammonia vapor absorber in which a particular absorber material is disclosed and the physical configuration of the canister is such that the exhaust from the degassing chamber is introduced at one end of the absorber canister and exits at the other end, and is disposed at a generally horizontal position.

This orientation of the canister in that application is to adapt the same to a particular mounting arrangement described and claimed in that application. The absorber materials are described as a mixture of fibrous and granular material obviating the tendency for "channelization" to occur due to settling of the contents along the length thereof. Such channelization creates openings through the absorber materials through which the exhaust air will have a tendency to directly pass drastically reducing the effectiveness of the absorber.

The general arrangement of the prior art has been that in which a container of absorber material is provided in which the air to be degassed is introduced in one end and passed out through the outer end thereof.

It is therefore an object of the present invention to provide an absorber canister of a configuration minimizing channelization through the absorber material and which is adapted to a vertically oriented installation of the absorber canister.

SUMMARY OF THE INVENTION

These and other objects of the present invention, which will become apparent upon a reading of the following specification and claims, are achieved by a self-contained disposable package which houses a container or developer liquid as well as an ammonia vapor absorber canister which is adapted to be readily hooked up to the developer chamber supply and exhaust lines, and the absorber canister connected to the degassing chamber exhaust. This packaging consists of a paperboard carton, in which is received a container of ammonia developer solution and the canister of absorber materials, disclosed as activated charcoal and excelsior saturated with phosphoric acid.

The respective quantities of developer liquid and absorber materials are correlated such that upon exhaustion of the developer liquid, the useful life of the absorber material is likewise substantially exhausted such that the entire package can be removed and disposed of and replaced with a fresh container, thereby halving the maintenance duties involved.

The absorber materials are disposed in a separate paperboard box defining a canister disposed within the partition, closed off at the top end by a cap formed with an array of breather openings, and a central guide opening receiving a flow tube adapted to be connected to the degassing chamber exhaust.

The flow tube extends downwardly through the absorber materials as is seated on a support at the bottom of the tube. The bottom support is adapted to position the end of the tube to allow the exhaust from the degassing chamber to pass down the length of the tube and pass out through the tube ending, back upwardly through the absorber materials and out through the breather openings of the cap.

This arrangement enables a convenient top connection to a vertically oriented absorber canister housed within a carton while the absorber material composition and vertical orientation thereof minimizes the tendency for the occurrence of channelization in the absorber materials.

Alternatively, the absorber canister may be defined by a partitioned carton with a plastic coating or film liner for the partitioning serving to contain any excess of phosphoric acid which may accumulate within the container.

The copackaging of the developer liquid and absorber materials offers the further advantage of the tendency of these materials to neutralize each other in the event of shipping damage since the developer liquid is typically ammonia hydroxide, a strong base, with the absorber materials disposed as containing phosphoric acid. Any resultant mixing of the materials produces an acid-base neutralizing effect.

DESCRIPTION OF THE DRAWINGS

FIG. 4 is a fragmentary exploded view of the flow tube and support incorporated in the absorber canister employed in the package of FIGS. 1-3.

FIG. 5 is a sectional view of an alternate form of the absorber canister.

FIG. 6 is a perspective view of a copier machine with the self-contained package of the absorber canister and developer solution installed.

FIG. 7 is a sectional view of an alternate from of canister flow tube support.

DETAILED DESCRIPTION

In the following detailed description, certain specific terminology will be employed for the sake of clarity and particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
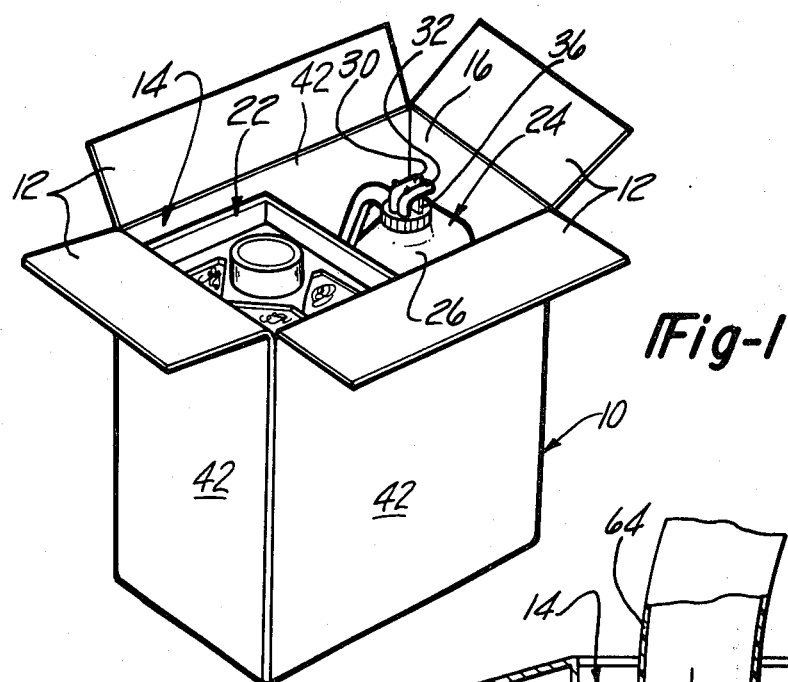
FIG. 1 is a perspective view of a self-contained package of absorber canisters and developer solution according to the present invention.

Referring to FIG. 1, the self-contained disposable package according to the present invention consists of an outer package or carton 10 having closure flaps 12 which may be formed of paperboard which is sized to afford two side-by-side spaces 14 and 16, respectively, within the interior of the outer package or carton 10.

The carton 10 is intended to normally be shipped with the closure flaps 12 closed and sealed. The side-by-side spaces 14 and 16 house an absorber canister 22 and a developer supply container 24, respectively. Developer supply container 24 may be of conventional configuration, but preferably is of the design shown in U.S. Pat. No. 4,080,989. This includes a plastic vessel 26 and a threaded cap 28 which are provided with a supply tube 30 and an exhaust tube 32.

Supply tube 30 is of shorter length and the terminal end portion is disposed above the level of the developer liquid 34 disposed in the plastic vessel 26. The exhaust tube 32, on the other hand, is of a longer length with the terminal end extending into the supply liquid as is well known to those skilled in the art.

The air is exhausted from the developer chamber to bubble through the developer liquid 34 causing the air above the level to become saturated with ammonia and water vapor. The developer liquid 34 is commonly ammonia hydroxide, i.e., formed with a solution of ammonia in water, and may contain a carbon dioxide as well, as is described in the above-cited U.S. Pat. No. 3,915,708.

The ammonia and moisture vapor laden air is drawn out through the supply tube 30 and exhaust line 76 into the copier development chamber, in order to develop the exposed print material, all in a manner well known in the art.

According to U.S. Pat. No. 4,080,989 and the aforementioned patent application, advantageously the portions of the supply and exhaust tubes 30 and 32, respectively, protrude above the threaded cap 28 and are maintained in a folded position to close off the interior of the bottle prior to connection and disconnection of the supply and exhaust lines, for reasons set forth in detail in that patent.

Preferably, such design is incorporated here such that upper portions of the supply and exhaust tubes 30 and 32 may be stowed in the folded position as shown in FIG. 1, retained by suitable clip retainer 36.

Figure 3:
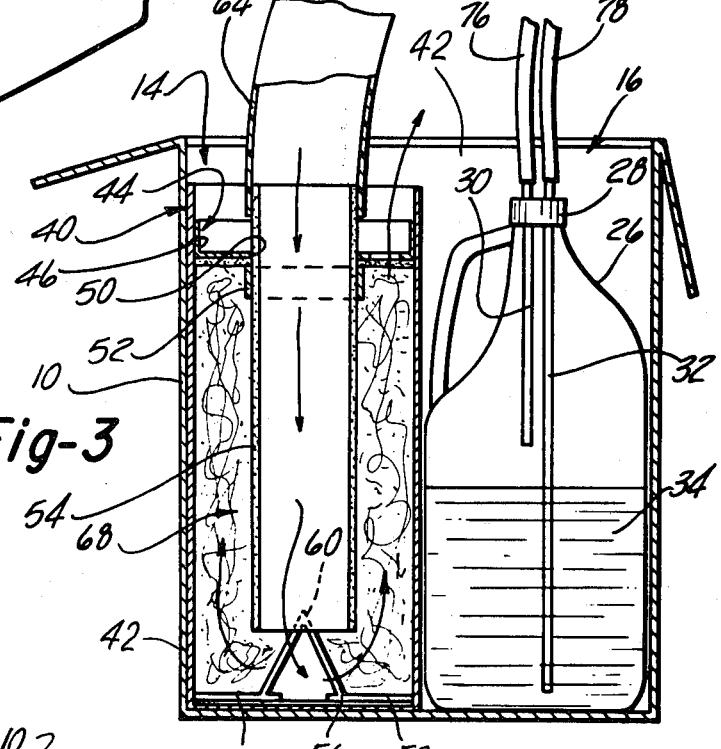
FIG. 3 is a view of the section 3—3 of the absorber canister portion illustrated in FIG. 2.
Figure 2:
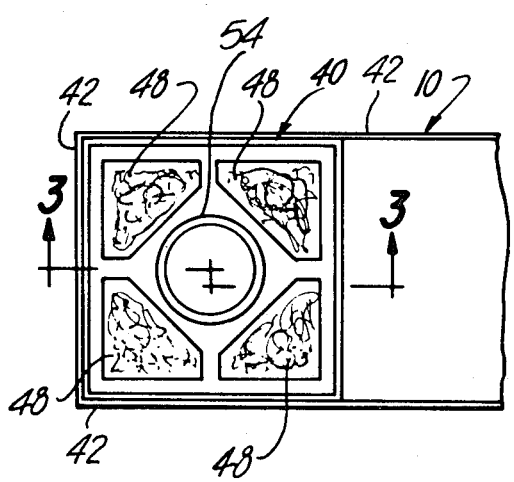
FIG. 2 is a fragmentary top view of the package of FIG. 1.

The configuration of the absorber canister 22, on the other hand, is not of a known design and forms a part of the present invention. One form of this canister design is seen in FIGS. 1-3. The canister 40 is comprised of a paperboard box sized to just fit between the sidewalls 42 such as to be contained in the side-by-side space 14. The top of the canister 40 receives a top cap 44 having a skirt portion 46 fit within the interior of the canister 40 and secured therein as by glueing. Top cap 44 is provided with a series of breather openings 48 extending about the circumference thereof closed with a porous sheet material. A central opening 50 and retainer ring 52 receive a central flow tube 54 secured within the retainer ring 52 and positioned thereby centrally of the interior of the canister 40, extending downwardly through the length thereof. The bottom end of the central flow tube 54 is positioned on a paperboard support 56 having flaps 58 positioned against the bottom of the canister 40.

The bottom end of the central flow tube 54 is open and is positioned on a cutout 60 formed in a V-fold 62 formed centrally of the flaps 58 as shown in FIGS. 2 and 4.

The central flow tube 54 has a top end portion which protrudes above the top cap 44 and to which may be affixed a length of flexible tubing 64 adapted to be fit with the copy machine exhaust outlet (FIG. 4).

The interior of the canister 40 is filled with a quantity of absorber material generally indicated at 68 which preferably takes the form of a mixture of excelsior and granular activated charcoal with a phosphoric acid treatment for both of these compositions.

It has been found, as noted in copending application Ser. No. 38,031, filed May 10, 1979, attorney Docket No. MIC-102, that this mixture provides a very effective absorption and resists channelization due to the mixture of fibrous and granular absorber materials.

The flow from the copy machine degassing chamber is thus introduced through the central flow tube 54 passing through to the bottom and emanating to pass upwardly through the absorber material 68 and thence outwardly through the breather openings 48, after the ammonia vapors have been absorbed.

This arrangement enables the side-by-side placement of the developer and absorber cartridges with a vertical disposition and direct access for making the tubular connections.

In addition, the vertical disposition of the supply tube 30 in the absorber canister 22 resists channelization of the flow therethrough, as distinguished from horizontal type flow absorber canisters.

The canister 40 is preferably moisture and acid resistant as may be afforded by a plastic coating or a separate plastic film liner.

Accordingly, in practice, in replacing a combined developer-absorber package in service, the closure flaps 12 are opened, after removal of the outer wrap, and the supply and exhaust tubes 30 and 32 are unsealed and released so as to be disposed in a generally upwardly extending position as shown in FIG. 3.

Closure flap 12 may be hooked up to the copy machine indicated at 74 in FIG. 4 with developer chamber supply and exhaust lines 76 and 78 hooked to the supply and exhaust tubes 30 and 32, respectively, for a quick and convenient hook up.

The quantity of developer liquid 34 and absorber material 68 are correlated such that as soon as the copy machine 74 exhibits poor copy development, the entire carton 10 is replaced since the absorber materials will then be substantially exhausted. This thus simplifies the maintenance chores associated with achieving proper operation of the copy machine 74.

The tubes are then resealed for disposal of the carton 10 and a fresh carton 10 placed in service.

The carton 10 of course can take many configurations and be constructed of a wide variety of differing materials within the scope of the present invention.

For example, as shown in FIG. 5, rather than a separate canister 40, the side-by-side space 14 may simply be filled with an absorber material 68 with a liner 84 of plastic provided or a suitable plastic coating of the carton interior and side-by-side spaces. A suitable configuration of a top cap 86 having openings 87 is provided to mate with the liner positions within the side-by-side spaces 14. The central flow tube 54 is positioned as above to enable outflow through the bottom end thereof.

The flow tube 54 may also be positioned in a cardboard X-piece 92 as shown in FIG. 7 to enable outflow through the bottom.

Accordingly, it can be appreciated that the above-recited objects of the present invention have been achieved inasmuch as the separate servicing requirement of providing the developer supply and absorber liquid supply has been reduced to one requirement. The self-containment of the development liquid and the absorber canister cartridges provides convenient and effective devices. The absorber canister itself is highly resistant to channelization, is simple in configuration and adaptable for low cost manufacture. The placing in service and disposing of the package is both safe and convenient. Finally, the copackaging of acid and base materials minimizes the potential damaging effects of each due to damage during shipment by the self-neutralizing tendency of the materials involved.

The embodiments of the invention in which an exclusive property or privilege is claimed are defined as follows:

1. An absorber canister for use in absorbing ammonia vapor from an air flow, comprising:
   a hollow canister body having sidewalls and a bottom joined to said sidewalls;
   a quantity of ammonia vapor absorbent material disposed within the interior of said canister body;
   a flow tube extending substantially through the length of said canister body and having an opening in one end thereof within said canister body through which air may flow into said interior whereby air flow containing ammonia vapor passes through said flow tube, exits from said opening and passes through said absorbent material; and
   means for mounting said flow tube within said canister body, said mounting means including-
   (1) a V-shaped support having an apex engaging said one end of said flow tube and supporting said one end in spaced relationship to said bottom, and
   (2) flap means secured to said support and overlying said bottom.

2. The canister of claim 1, wherein said V-shaped support includes a cutout in said apex, one end of said flow tube being captively held in said cutout.

3. The canister of claim 1, wherein said support includes a pair of panels hingedly interconnected by a first fold line defining said apex, and said flap means includes a pair of flaps respectively hingedly connected to said panels by second and third fold lines.

4. The canister of claim 1, wherein at least two of said sidewalls of said canister opposes each other and said flap means includes a pair of flaps, said flaps respectively including edges abutting said two sidewalls respectively, whereby to prevent lateral movement of said support.

5. An absorber canister for use in absorbing ammonia vapor from an air flow comprising:
   a hollow canister body having opposing sidewalls and a bottom joined to said sidewalls;
   a quantity of ammonia vapor absorbent material disposed within the interior of said canister body;
   a flow tube extending into said canister body and having an opening in one end thereof within said canister body through which air may flow into said interior, whereby air flow containing ammonia vapor passes through said flow tube, exits from said opening and passes through said absorbent material; and
   means for mounting said flow tube within said canister body, said mounting means including a pair of cross members extending between and engaging said opposing sidewalls, said cross members being inclined to said sidewalls and defining a transversely extending V-shaped channel for supporting said one end of said flow tube in spaced relationship to said bottom and allowing escape of air flow from said opening into said interior.

* * * * *